Figure 1:
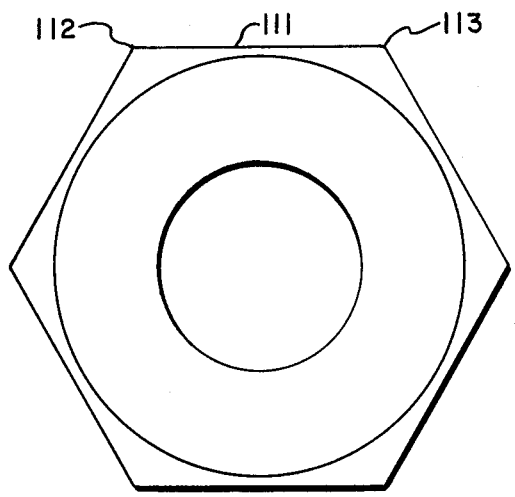

Jan. 25, 1966 A. F. KOMOROWSKI ET AL 3,230,623
VARIABLE ANGLE PERSPECTIVE DISPLAY DEVICE
OPERABLE WITH ELLIPSOGRAPH
Filed Nov. 27, 1963 5 Sheets-Sheet 1

*INVENTORS*
*ALEXANDER F. KOMOROWSKI*
*HENRY A. KOMOROWSKI*
BY

ATTORNEY

INVENTORS
ALEXANDER F. KOMOROWSKI
HENRY A. KOMOROWSKI
BY
ATTORNEY

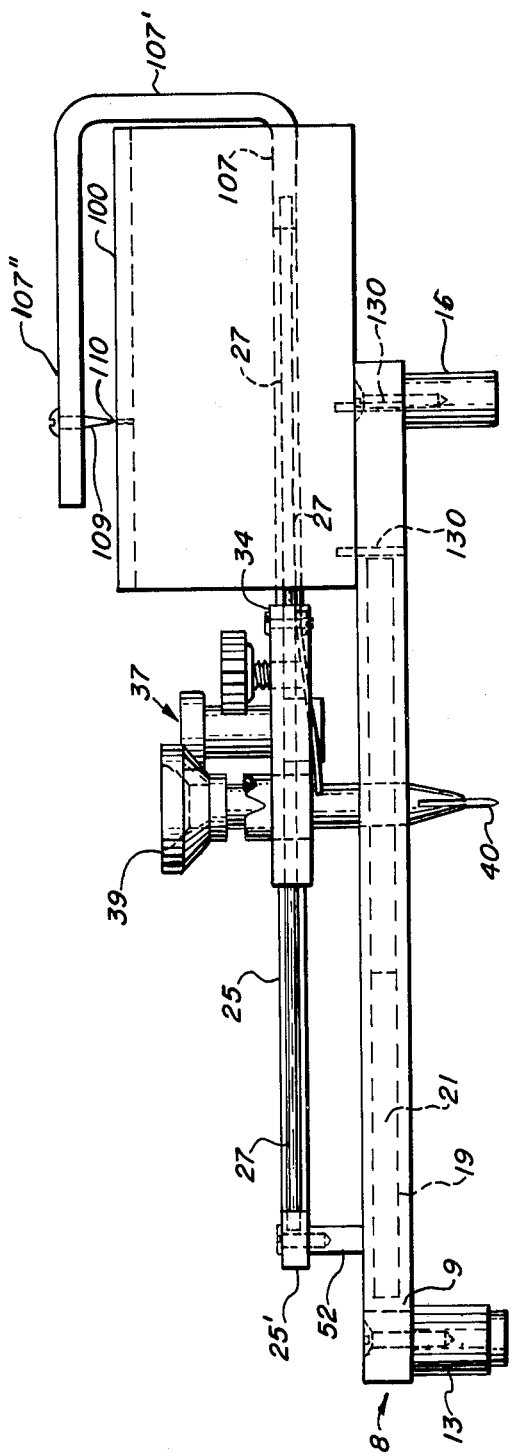

United States Patent Office 3,230,623
Patented Jan. 25, 1966

3,230,623
VARIABLE ANGLE PERSPECTIVE DISPLAY DEVICE OPERABLE WITH ELLIPSOGRAPH
Alexander F. Komorowski and Henry A. Komorowski, Elizabeth, N.J. (Both of 69 E. 4th St., Bayonne, N.J.)
Filed Nov. 27, 1963, Ser. No. 327,875
4 Claims. (Cl. 33—23)

This invention relates to a device for drawing a variable-angle perspective display of an object. More specifically, it deals with a drafting device for drawing a perspective view, at any desired angle, of a plan drawing, for example, of any object. The device is operable with an ellipsograph, or with a minor diameter arm portion of an ellipsograph, the latter carrying a tracing stylus attached to a reciprocable scale arm which can turn, to some degree, in a monoplanar motion. The invention comprises a raised platform straddling the free end of said arm, and an extension of said arm disposed over said platform, said extension being provided with a downwardly directed stylus for tracing or spotting a plan view drawing, for example, disposed on said platform. This enables the scriber to draw or spot a perspective display of said object at any desired angle, once the proper minor diameter arm, or ellipsograph settings, are made.

An ellipse can be defined as the parallel projection or shadow of a circle on a plane. When the circle is parallel to the plane depicting its shadow or projection, i.e., when the angle made by the circle with respect to the projection plane is 90°, the projection is that of a complete circle. Also, when the angle of the circle is zero with respect to the projection plane, the projection is a straight line. Between these two angular positions of the circle, the projection will be an ellipse having a constant major axis and a variable minor axis, depending upon the angle of tilt of the circle with respect to the projection plane.

Ellipsographs are available for drawing an ellipse of any desired angle of tile. One such instrument, for example, is disclosed in copending application Serial No. 275,890, filed on Apr. 26, 1963 by Alexander F. Komorowski and Henry A. Komorowski, now Patent No. 3,167,863. This latter unit employs a frame and a slide arm carrying a minor axis scale and movably attached at one end in the frame in reciprocable and slightly-turning monoplanar motion.

This scale arm also carries a slidable scriber and a pointer coacting with the scale on the arm for adjusting the minor diameter (or angle of tilt). The free end of the scale arm is adjustably attached to a rotatable arm, the adjustment being for the major axis of the ellipse. In operation, the scriber slide is set for the desired minor axis and locked to the scale arm. Then, the rotating arm adjustment is made (by matching a line on the slide with a major axis scale on the frame), and the scale arm is locked onto the rotating arm which, however, is free to rotate. Then, the scriber is placed on paper or other material on which the ellipse is to be drawn, and the scale arm-rotating arm assembly is rotated by means of a pivoted knob, whereupon the desired ellipse is drawn on the paper.

According to the present invention, a platform is provided above the knob, in straddling relation thereto, and an extension is attached to the free end of the slide arm, said extension projecting beyond and over said platform. This extension carries a tracing stylus aligned with said knob, so that, when a sheet of paper carrying a plan view drawing of an object is affixed onto the platform, and the drawing is traced with the stylus, it is possible to depict, by means of the ellipsograph scribing, a perspective full or sectional view, at any desired angle, of the object depicted on the plan view drawing. Also, if only the minor diameter arm is employed (the major diameter arm being dispensed with), it is possible to draw or spot the aforesaid perspective display at any desired angle, as will be explained further.

Figure 2:
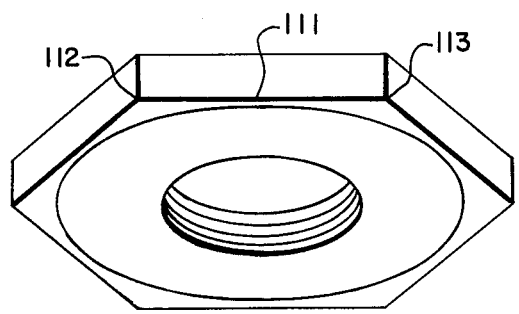
Figure 3:
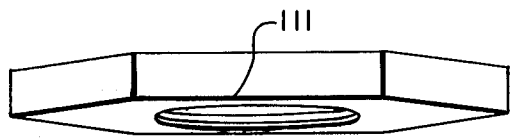

The invention will be more readily understood by reference to the accompanying drawings, in which a preferred embodiment is described, and in which FIGURE 1 illustrates a plan view drawing of a nut, while FIGURE 2 shows a 40° perspective view of the same nut converted from said plan view of FIGURE 1 by means of the present invention. A 5° perspective view of the same nut, produced from the same plan drawing by means of the present invention, is presented in FIGURE 3.

Figure 4:
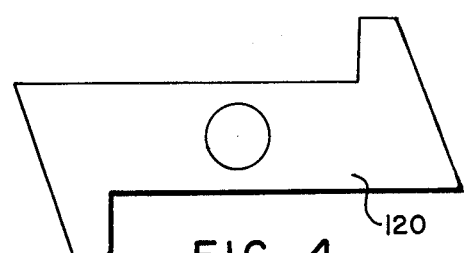
Figure 5:
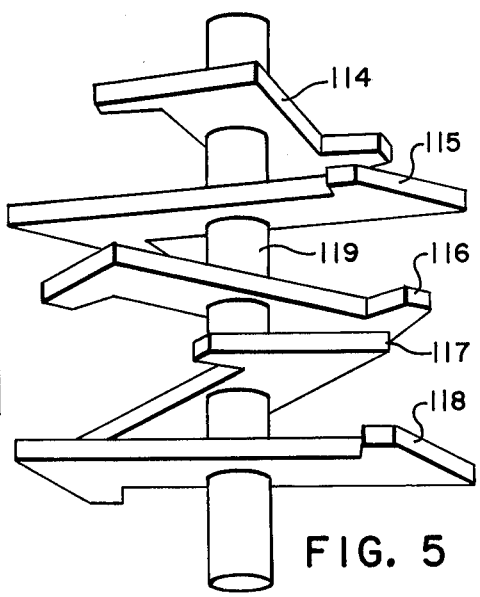
Figure 6:
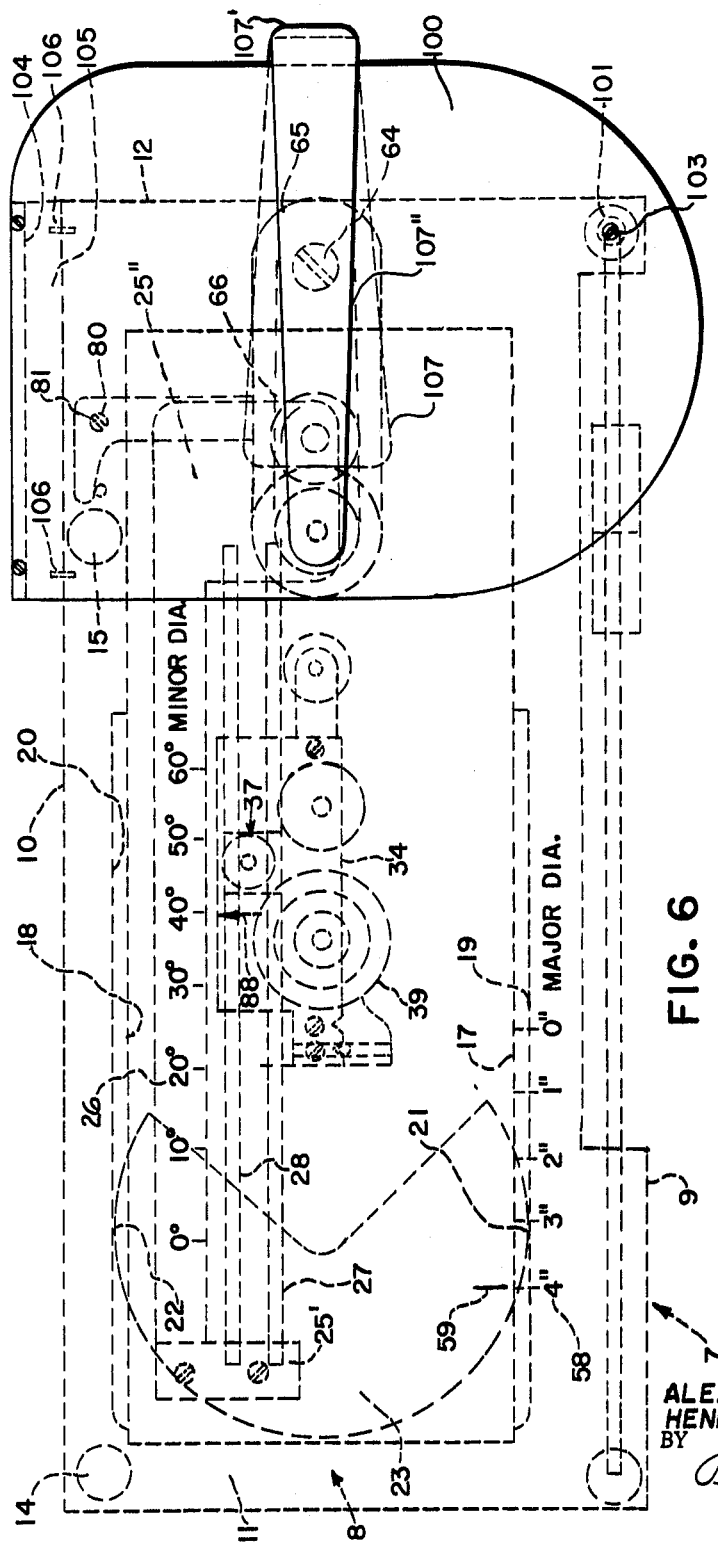
Figure 7:
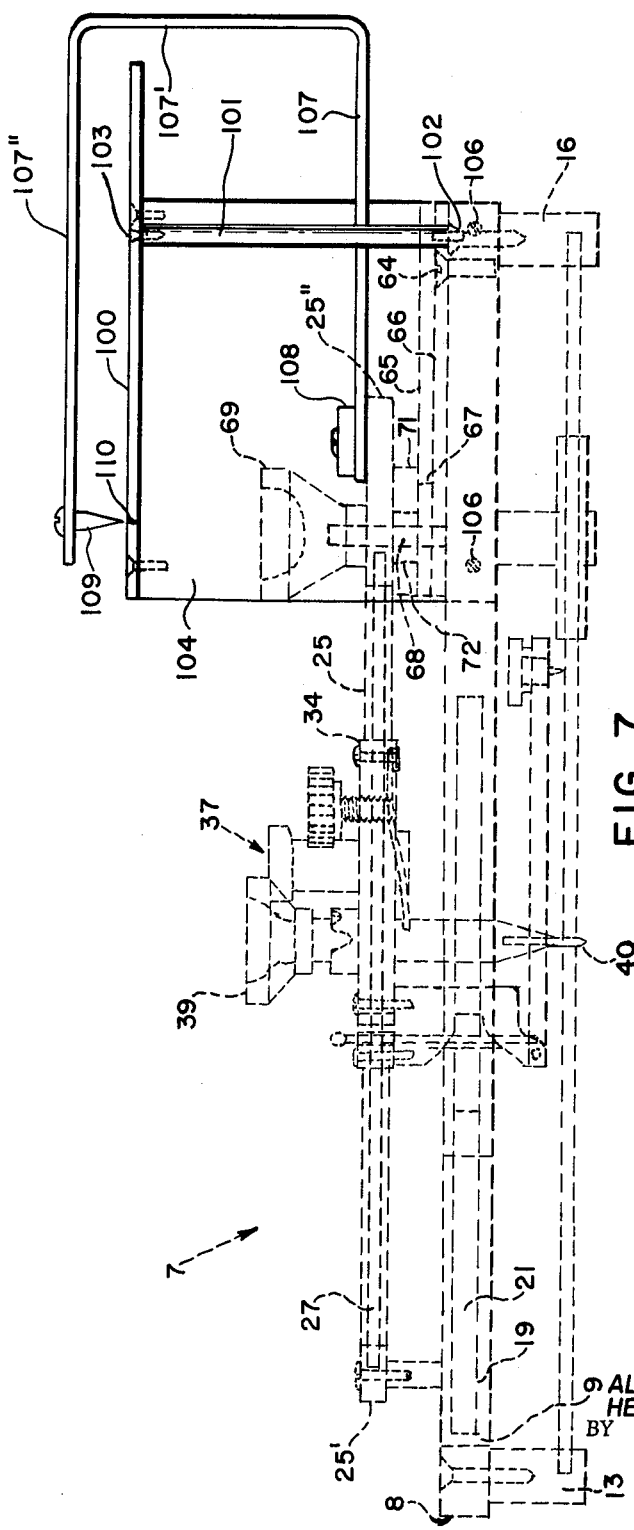
Figure 8:
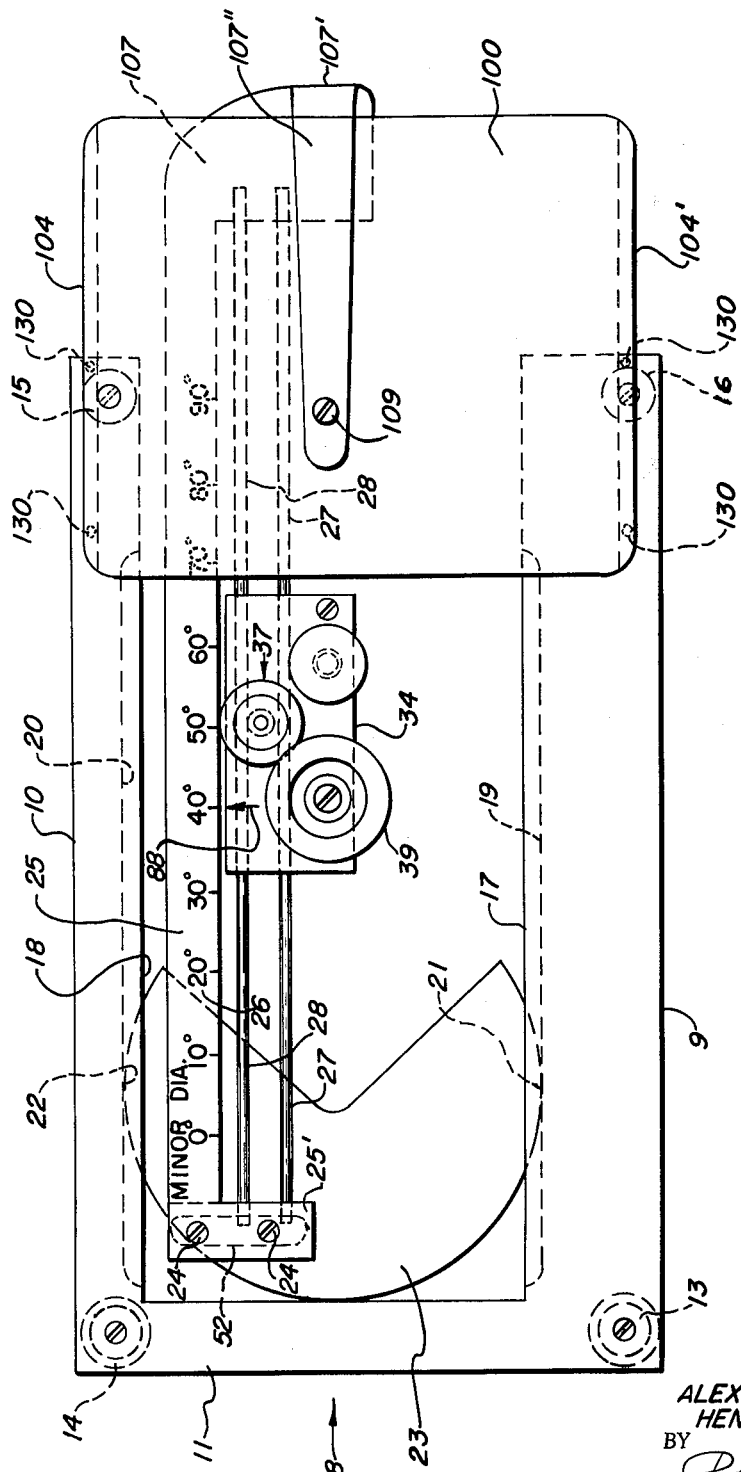

FIGURE 4 shows a plan view of an ice-chopper blade to be depicted in 20° perspective as mounted on vertical shaft, the blades being staggered 72° apart. FIGURE 5 illustrates the desired perspective view as easily drawn from FIGURE 4 by use of applicants' invention. FIGURE 6 illustrates a top or plan view of applicants' invention as attached to an ellipsograph, while a front elevational view thereof is depicted in FIGURE 7. FIGURE 8 presents a plan view of the minor diameter portion of an ellipsograph (the major diameter portion and auxiliary scriber being omitted), equipped with the variable-angle perspective display device of the present invention, while FIGURE 9 shows a front view of the device depicted in FIGURE 8. Similar numerals refer to similar parts in the various figures.

Referring again to the drawings, numeral 7 indicates generally an ellipsograph, such as that disclosed in the aforesaid application Ser. No. 275,890. This ellipsograph consists of a frame, indicated generally by numeral 8, and having front 9, back 10, and sides 11 and 12. Frame 8 is supported by legs 13, 14, 15 and 16. The inner edges 17 and 18 of frame members 9 and 10, are provided with grooves or races 19 and 20, respectively, in which slide the rounded edges 21 and 22 of slide 23. Arcuate edges 21 and 22 have a common diameter.

Scale arm 25 is affixed at one end to slide 23 by post 52, and it has printed scale 26 for the minor axis, which is used in conjunction with arrow indicator 88 on scriber slide 34. The latter is able to slide on rods 27 and 28 mounted between the ends 25' and 25" of scale arm 25, and it may be locked onto the rods by knob lock 37. Scriber slide 34 carries vertically-adjustable scribe point 40, which can be lowered into position on the paper on which the ellipse is to be drawn, the point being manipulated by knob 39.

Attached to the middle of the frame side 12, opposite slide 23, is short arm 65 pivoted at its end at 64, and capable of being rotated about said pivot. Arm 65 has a groove 66 cut lengthwise its upper surface, and lockable tenon 67 is slidable in this groove.

The other end 25" of scale arm 25 is swivably attached to tenon binding plate 71 by screw 68, which terminates with knob 69, in a manner such that, when knob 69 is screwed down tight, tenon 67 is locked tightly in groove 66 against binding plate 71, but scale arm end 25" is free to move around bushing 72 as arm 65 is rotated around pivot 64.

A line-up stop 80 is mounted on swivel 81. This stop is an arm which abuts short arm 65 to place the ellipsograph in line-up position. It will be noted that when arm 65 is in this line-up position, its swivel center 64 is in line with the center of knob 69 which, in turn, is in line with scriber point 40.

Thus, it is seen that the operation of the ellipsograph involves first the setting of indicator 88 alongside the desired angle of tilt (minor axis) on scale 26. Then, the instrument is lined up with respect to stop 80, and knob 69 is loosened to allow slide indicator 59 to be set alongside of the desired major axis of the ellipse on scale 58, after which the knob 69 is tightened, the scriber point 40 is lowered on the paper, and knob 69 is rotated, whereby the desired ellipse is drawn on the paper.

The present invention is attachable to the aforesaid ellipsograph. As can be seen from the drawings, the present invention comprises a platform 100 made of transparent plastic sheet. A post 101 supports the forward end of the platform, and it is attached to ellipsograph frame 8 by screw 102 and to the platform by screw 103. The rear edge of platform 100 is supported by side 104 and bottom 105 which has pins 106 which enter holes in the edge of frame member 10.

Arm 107 is attached to scale arm end 25" by screw 108. This arm is bent upwardly to clear the platform edge, as extension 107', and then sidewardly over platform 100, as extension 107", terminating with a downwardly-directed stylus 109. A mark 110 is made on platform 100 as hereinafter explained. This mark is considered the center for any plan drawing to be traced on a sheet of paper on platform 100, and is the center setting for stylus 109. Tracing stylus 109 is positioned so that it is disposed directly above mark 110 when scriber point 40 is in line with the center of the pivot of knob 69, and pivot 64 of rotatable arm 66, i.e., when the ellipsograph is in set-up position.

When in use, the ellipsograph first is set for the angle of tilt desired in the perspective view. For example, if the plan view is that of the bolt in FIG. 1, and a 40° perspective view is desired, as in FIG. 2, the minor axis setting 26 on scale arm 25 is 40°. Then, knob 69 is loosened, and tracing stylus 109 is moved (while the instrument is in set-up position), into juxtaposition with marker 110 on platform 100. Then, knob 69 is locked, and stop 80 is moved out of the way. The paper on which the perspective drawing is made is fixed under scriber point 40, using the center line and protractor technique, and major axis adjustment, as outlined in the copending application Ser. No. 275,890. The stylus is lowered, and the assembly is ready for the tracing operation, once the plan view of FIG. 1 is centered on platform 100 and fastened thereto by means of clips, or the like.

First, the round portions of the plan drawing are traced, the ellipsograph being moved for the required distance, as observed visually. Projecting portions and straight lines, such as line 111 on FIGS. 1–2, are first spotted at their ends by means of dots made by moving raised scriber point 40 to the desired termini (e.g., 112 and 113 for line 111), and then dropping the point after it has been spotted by tracting stylus 109, whereupon scriber 40 is dropped to make the dot. The lines between the dots are filled in by a ruler or by other conventional means.

The positions of blades 114, 115, 116, 117, and 118 on shaft 119 in FIG. 5 may be fixed by rotating the plan view of blade 120 in FIG. 4, to the desired angle on platform 100, and then fastening the plan view prior to use of the stylus 109. For this reason, a protractor may be inscribed or drawn on platform 100, if desired.

By means of this simple attachment, it is possible to effect considerable savings in time. For example, the perspective view of FIG. 5 was prepared readily in 15 minutes, whereas the layout by conventional means would have required hours.

As shown in FIGS. 8 and 9, only the minor diameter portion of an ellipsograph may be employed, using the variable-angle display device of the present invention for drawing a perspective display (from a plan drawing of an object, for example) at any desired angle. It will be noted from FIGS. 8 and 9 that the major diameter scale has been dispensed with from the ellipsograph, and that the stylus arm is made an integral part of and is an extension of the free end of the minor diameter scale arm, compared to the connected extension of FIGS. 5 and 6.

Referring to FIGS. 8 and 9, it will be noted that frame 8 now has only three sides 9, 10 and 11, and that the right side has been removed to permit lateral movement, within the open side, of extension 107 of minor diameter scale arm 25. As in the case of the ellipsograph shown in FIGS. 5 and 6, arm extension 107 is connected to vertical support 107', which, in turn, is connected to horizontally-extending stylus arm 107", from which extends downwardly the stylus 109. Members 107, 107' and 107" preferably are made of self-supporting transparent plastic sheet.

Attached to front and back frame members 9 and 10, by screws, are transparent plastic sides 104 and 104' which support transparent plastic platform 100 disposed under stylus 109 and high enough to permit plate 34 and its accessory members to slide underneath without interference. As in the case of FIGS. 5 and 6, a mark 110 is made on platform 100 to serve as a center for the plan drawing to be affixed onto the platform, which drawing is to be traced or spotted. This mark 110 is in lateral alignment with scriber 40 and also is in alignment with the 90° setting of the minor diameter scale 26 (or the equivalent thereof, if the scale is not graduated to that extent).

It will be noted, with respect to the unit depicted in FIGS. 8 and 9, that since the rotating arm is omitted, a plan drawing of an object, placed on platform 100, need not be confined to the size of the radius sweep of any rotating arm. Thus, the drawing on the platform can be much larger than one useable with a complete ellipsograph, and may extend as far as the outer reaches of stylus arm 107". In such case, it is apparent that, in most cases, lines could be traced directly on the platform for their full lengths, thus eliminating the necessity of merely spotting their locations with dots and then drawing them in with a ruler. However, such lines would not be perfect, due to elimination of the guiding feature, so that spotting would be recommended if perfect lines are required.

Although the drawings illustrate an ellipsograph, or portion thereof, in which the slide moves in an arc as the scale arm reciprocates, it is also apparent that the slide can be made to reciprocate only, while the scale arm may be pivoted thereon for obtaining the arcuate motion of the scriber. The essential feature, however, is the fact that both slide and arm must reciprocate, as required, while one of these elements must follow the arcuate motion generated by rotation of the rotating arm.

This application is a continuation-in-part of copending application Ser. No. 289,500, filed on June 21, 1963 by Alexander F. Komorowski and Henry A. Komorowski, now abandoned.

Although, in this disclosure, the ellipsograph, or portion thereof, is described as having a frame, it is to be understood, however, that such frame may be a portion of a drawing board, or a black board, for example, in which latter case, the scriber could incorporate a piece of chalk.

We claim:

1. A variable-angle perspective display device, of the type described, and operable with an ellipsograph portion having a scriber point attached to a minor axis scale arm, one end of which is affixed to a partially-rotatable slide designed to slide laterally between frame members, and comprising, a platform attachable to an ellipsograph frame over a free end of a minor scale arm thereof, a stylus arm extension attachable to a free end of a minor scale arm and extending laterally under and past said platform, upwardly and over said platform and a downwardly-directed tracing stylus mounted in the free end of said extension.

2. A variable-angle perspective display device, of the type described, and operable with an ellipsograph portion having a scriber point attached to a minor axis scale arm, one end of which is affixed to a partially-rotatable slide designed to slide laterally between frame members, and comprising,
- a platform attachable to an ellipsograph frame over a free end of a minor scale arm thereof,
- a stylus arm extension attachable to a free end of a minor scale arm and extending laterally under and past said platform, and upwardly and over said platform,
- a downwardly-directed tracing stylus mounted in the free end of said extension, and
- a centering mark disposed on said platform and aligned with an ellipsograph scriber and approximately with the point at which a 90° marking would be present on an ellipsograph minor diameter scale arm.

3. A variable-angle perspective display device, comprising,
- a frame having a front, a back, a side, and an open side, and having slide-engaging means at the inner edges of said front and back,
- a slide movable within said frame between said slide-engaging means, and designed to rotate slightly and to reciprocate therein,
- a scale arm carrying an ellipsograph minor axis scale and affixed at one end to and above said slide in a manner such that said slide and scale arm are movable laterally as a unit, said arm projecting laterally toward said open side,
- a plate slidably engaged to said scale arm and carrying an indicator coacting with the scale on said scale arm and designed to slide lengthwise adjacent to said scale,
- a vertically-adjustable scriber mounted in downwardly-directed relation on said plate,
- a platform attached to said back and front in the vicinity of the free end of said scale arm and disposed sufficiently above said scale arm and plate to allow passage thereof thereunder,
- a stylus arm extension attachable to the free end of said scale arm and extending laterally under and past said platform, and upwardly and over said platform, and
- a downwardly-directed tracing stylus mounted in the free end of said extension.

4. A converter, of the type described for converting a plan view of a drawing into a variable angle perspective display, used in conjunction with an ellipsograph having a scriber point, and a minor axis scale arm pivotally-connected at its end to a rotatable arm swiveling on a fixed pivot attached to the side of the ellipsograph frame, comprising,
- a platform designed to be disposed above a rotatable portion of an ellipsograph and fastenable to a frame thereof,
- a stylus arm attachable to a pivotally-connected end of an ellipsograph scale arm and extending beyond and above said platform,
- a centering mark disposed on said platform marking the juxtaposition center of a fixed pivot of an ellipsograph rotatable arm,
- a downwardly-directed tracing stylus designed to trace a plan drawing on said platform and mounted in the upper end of said stylus arm and positioned directly above said centering mark when an ellipsograph scriber point, scale arm pivot connection center, and rotatable arm pivot, are in line with each other, and
- fastening means for fastening said stylus arm onto a scale arm in a manner such that when a plan drawing is attached to said platform and the desired perspective angle thereof is set on an ellipsograph arm, tracing of the plan drawing with said stylus enables drawing of a perspective view at the set angle by an ellipsograph scriber point.

References Cited by the Examiner
UNITED STATES PATENTS

| | | | |
|---|---|---|---|
| 184,493 | 11/1876 | Anderson | 33—30 |
| 2,351,452 | 6/1944 | Pash | 33—24 |
| 2,714,254 | 8/1955 | Andrews et al. | 33—30 X |
| 3,065,545 | 11/1962 | Thompson | 33—30 |
| 3,127,679 | 4/1964 | Crook | 33—24 |

ISAAC LISANN, *Primary Examiner.*